Aug. 16, 1927.
H. SALINGER
1,639,201
TELEGRAPH CABLE PROVIDED WITH LOADING COIL
Filed Jan. 16 1926
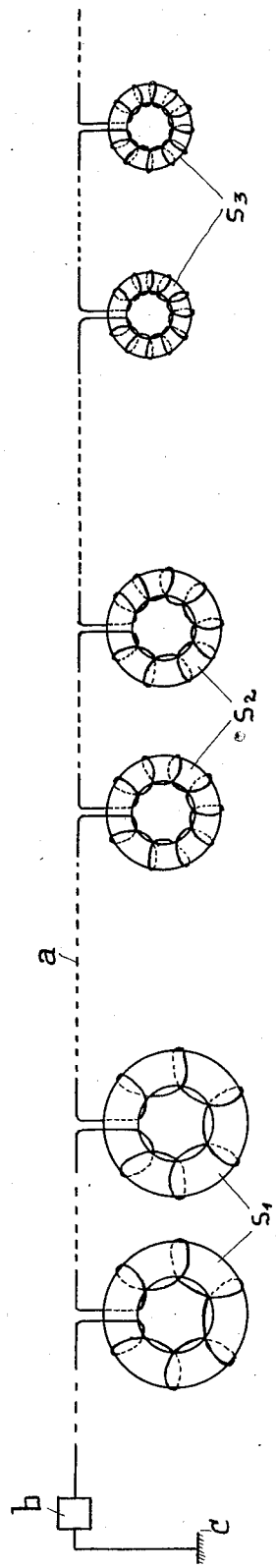
H. Salinger
inventor
By: Marks & Clerk
Attys.

Patented Aug. 16, 1927.

1,639,201

UNITED STATES PATENT OFFICE.

HANS SALINGER, OF BERLIN, GERMANY.

TELEGRAPH CABLE PROVIDED WITH LOADING COIL.

Application filed January 16, 1926, Serial No. 81,822, and in Germany January 23, 1925.

This invention relates to telegraph cables provided with loading coils.

If we try to apply to telegraphy the method of loading a cable with coils which is known in telephony, a series of peculiar difficulties are encountered. One of these difficulties is that the strengths of the currents which are sent through such a cable are of the order of 100 milliamps, which strengths are not encountered in telephony.

If such a current is sent through a coil (it is always assumed that we have to deal with coils having iron cores) it is found that its inductivity is substantially greater than that shown by the same coil in the case of very weak currents. The inductivity of a coil having an iron core is dependent upon the strength of the current which is very detrimental in telegraphy, for instance as regards the retardation of the increase in current due to the inductivity and as regards the difficulties of balancing in the case of duplex operation.

If the resistance loss of a coil is investigated it is found that also the same depends upon the strength of the current and as a matter of fact to a greater extent than the inductivity. The result thereof is that the damping of the telegraph currents is increased and this increase may be so great that the advantage of the insertion of coils is entirely lost. We are mainly concerned in this case with the hysteresis losses and these may be considered to be approximately proportional to the strength of the current. This means that the same coils which in the case of very weak currents have only a small and not very detrimental resistance loss, may be useless as regards strong telegraph currents.

All the mentioned phenomena are due to the same reason, namely that the density of the flux in the core of the coil is too large when the coil is traversed by telegraph currents. This may be remedied by increasing the cross section of the iron throughout the cable; this, however, leads to very large and expensive coils and to a cable which it is hardly possible to lay.

As the large currents flow only in the proximity of the ends of the cable and owing to the damping of the cable they drop to such an extent within a comparatively short portion of the cable that the hysteresis losses no longer have a great detrimental effect, according to the present invention the cable is not provided throughout with coils which are entirely equal to one another, but with coils, of which those inserted in the proximity of the ends of the cable have iron cores of larger cross section than the iron cores of the coils provided in the middle of the cable. Use may be made of different types of coil having an increased cross section the cross section of the coils being gradated according to the currents flowing through the coils at the corresponding parts of the cable.

The drawing illustrates diagrammatically a single core telegraph cable loaded with coils proivded with cores of different cross section. The conductor $a$ is earthed at $c$ over the telegraph apparatus $b$, $s_1$, $s_2$, $s_3$ being coils inserted in the cable. It will be seen from the drawing that three different sizes of coils are employed. The windings of the coils $s_1$ are traversed by the largest currents for which reason their cross section is made largest. The currents become smaller and smaller with increased distance from the end of the cable and consequently the cross section of the cores of the coils are made smaller.

It has already been proposed for other apparatus to reduce the inductance of the coils at the ends of the cable. The object which is contemplated by the present invention viz, the reduction of the eddy current losses can however be attained according to the present invention without employing coils which have substantially different inductances, the said object being attained solely by making the cross section of the cores of different sizes. In the cable illustrated in the drawing all the coils are intended to have the same inductance for the average current that comes into question at the various points of the cable; for this reason the number of turns of the coils $s_3$ must be greater than the number of turns of the coils $s_2$ and those of the latter coils greater than the number of turns of the coils $s_1$, since if all the coils had the same number of windings the coils having cores of larger cross section would possess a substantially higher inductance. The disadvantages of the arrangement according to the present invention are insignificant since owing to the fact mentioned above that owing to the large damping of the cable the current is reduced to such an extent even at a comparatively small distance from the end points of the cable that the hysteresis losses no longer play a very important part, the largest portion of the cable can be provided with coils of the usual construction. Consequently the number of coils having a larger cross section and the consequent increase in cost are small; the difficulties connected with the laying of the cable can easily be overcome as comparatively smooth water is generally found in the proximity of the ends of the cable; further such coils can be produced more easily as they have to withstand only a small water pressure.

The word "iron" used in the present specification in connection with iron coils is to be understood to mean any suitable magnetic material, thus for instance also cores consisting of a suitable composition.

What I claim is:—

1. Telegraph cable provided with loading coils the cores of the coils of the loading coils arranged in the proximity of the ends of the cable having a greater cross section than the cores of the coils arranged in the middle of the cable, for the purpose set forth.

2. Telegraph cable as claimed in claim 1, and in which the cross sections of the cores of the coils in the proximity of the ends of the cable are gradated, according to the currents flowing through the coils, for the purpose set forth.

In testimony whereof I have signed my name to this specification.

Dr. HANS SALINGER.